(12) United States Patent
Ripley et al.

(10) Patent No.: US 11,427,169 B2
(45) Date of Patent: Aug. 30, 2022

(54) APPARATUS, METHOD AND SYSTEM FOR DETERMINING THE POSITION OF VEHICLES CONNECTED TO A TRACTOR BY THE USE OF A GLOBAL POSITIONING SATELLITE (GPS)

(71) Applicant: Bendix Commercial Vehicle Systems LLC, Elyria, OH (US)

(72) Inventors: John V Ripley, Elyria, OH (US); Majed M Hamdan, North Olmsted, OH (US)

(73) Assignee: BENDIX COMMERCIAL VEHICLE SYSTEMS LLC, Avon, OH (US)

( * ) Notice: Subject to any disclaimer, the term of this patent is extended or adjusted under 35 U.S.C. 154(b) by 102 days.

(21) Appl. No.: 16/780,207

(22) Filed: Feb. 3, 2020

(65) Prior Publication Data
US 2021/0237700 A1   Aug. 5, 2021

(51) Int. Cl.
*B60T 8/17* (2006.01)
*G01S 19/51* (2010.01)
(Continued)

(52) U.S. Cl.
CPC ............ *B60T 8/1708* (2013.01); *B60T 8/172* (2013.01); *G01S 19/51* (2013.01); *B60T 13/66* (2013.01);
(Continued)

(58) Field of Classification Search
CPC .. B60T 13/66; B60T 2210/36; B60T 2250/02; B60T 8/1708; B60T 8/172; G01S 19/51
See application file for complete search history.

(56) References Cited

U.S. PATENT DOCUMENTS 4,231,442 A   11/1980   Birkeholm
4,743,888 A   5/1988   Hilpert et al.
(Continued)

FOREIGN PATENT DOCUMENTS

EP   1013533 B1   7/2004
WO   2016033255 A1   3/2016

OTHER PUBLICATIONS

Communication from European Patent Office (EPO) including Extended Search Report, dated May 19, 2021, 8 pages.
(Continued)

*Primary Examiner* — Tyler J Lee
(74) *Attorney, Agent, or Firm* — Brian E. Kondas; Cheryl L. Greenly; Eugene E. Clair

(57) ABSTRACT

Various examples of a controller, method and system for determining positions of a tractor-trailer vehicle train are disclosed. In one example a tractor controller is manually-initiated or a user-initiated tractor controller and includes an electrical control port for receiving an electrical start signal, and a communications port for receiving data. A processing unit of the tractor controller includes control logic and is in communication with the electrical control port. The control logic is capable of receiving, in response to the electrical start signal, a data signal at the communications port which includes a GPS signal and a unique identification which corresponds to the towed vehicle. At a predetermined response time, the tractor controller determines the position of the towed vehicle in the tractor-trailer vehicle train based on the data received from the towed vehicles.

17 Claims, 7 Drawing Sheets

(51) Int. Cl.
  *B60T 13/66*   (2006.01)
  *B60T 8/172*   (2006.01)

(52) U.S. Cl.
  CPC ....... *B60T 2210/36* (2013.01); *B60T 2250/02* (2013.01)

(56) References Cited

U.S. PATENT DOCUMENTS

| | | | |
|---|---|---|---|
| 5,025,253 | A | 6/1991 | DiLullo et al. |
| 5,327,781 | A | 7/1994 | Moran et al. |
| 5,523,947 | A | 6/1996 | Breen |
| 5,677,667 | A | 10/1997 | Lesesky et al. |
| 5,693,985 | A | 12/1997 | Gee et al. |
| 5,905,433 | A | 5/1999 | Wortham |
| 6,127,939 | A | 10/2000 | Lesesky et al. |
| 6,237,401 | B1 | 5/2001 | Haehn et al. |
| 6,501,376 | B2 | 12/2002 | Dieckmann et al. |
| 6,687,609 | B2 | 2/2004 | Hsiao et al. |
| 6,894,601 | B1 | 5/2005 | Grunden et al. |
| 7,307,514 | B2 * | 12/2007 | McAden ................ B60R 25/00 180/167 |
| 7,415,325 | B2 | 8/2008 | Knosmann et al. |
| 7,760,077 | B2 | 7/2010 | Day |
| 7,932,815 | B2 | 4/2011 | Martinez et al. |
| 8,098,145 | B2 | 1/2012 | Ancuta et al. |
| 8,179,238 | B2 | 5/2012 | Roberts, Sr. et al. |
| 8,346,407 | B2 | 1/2013 | Schneider et al. |
| 9,227,607 | B1 * | 1/2016 | Ripley ................ B60T 7/20 |
| 9,315,212 | B1 | 4/2016 | Kyrtsos et al. |
| 10,363,909 | B2 | 7/2019 | Ripley et al. |
| 2001/0040408 | A1 | 11/2001 | Lesesky |
| 2003/0222774 | A1 | 12/2003 | Koenigsberg et al. |
| 2004/0187674 | A1 | 9/2004 | Bennett et al. |
| 2004/0217575 | A1 * | 11/2004 | Beaujot ................ A01B 69/004 280/442 |
| 2007/0225872 | A1 | 9/2007 | Luebke et al. |
| 2008/0012695 | A1 | 1/2008 | Herschell et al. |
| 2008/0303648 | A1 | 12/2008 | Day |
| 2009/0102626 | A1 | 4/2009 | Lesesky |
| 2009/0160504 | A1 | 6/2009 | Morrison et al. |
| 2009/0189788 | A1 | 7/2009 | Faus et al. |
| 2010/0271189 | A1 | 10/2010 | Miller et al. |
| 2012/0146779 | A1 | 6/2012 | Hu et al. |
| 2012/0260716 | A1 | 10/2012 | Smith et al. |
| 2013/0147617 | A1 | 6/2013 | Boling et al. |
| 2013/0148748 | A1 * | 6/2013 | Suda ................ H04B 3/548 375/257 |
| 2014/0019010 | A1 * | 1/2014 | Smith ................ B62D 35/004 701/49 |
| 2014/0081543 | A1 | 3/2014 | Fry |
| 2015/0235481 | A1 | 8/2015 | Greenberger |
| 2016/0052453 | A1 | 2/2016 | Nalepka et al. |
| 2017/0197598 | A1 * | 7/2017 | Lesher ................ B60T 8/17551 |
| 2017/0240153 | A1 | 8/2017 | Ripley et al. |
| 2018/0202804 | A1 * | 7/2018 | Dumble ................ G01B 17/00 |
| 2019/0179034 | A1 * | 6/2019 | Tubergen ................ B61L 25/025 |
| 2020/0156606 | A1 * | 5/2020 | Switkes ................ B60W 30/02 |
| 2020/0160723 | A1 * | 5/2020 | Switkes ................ G05D 1/0027 |

OTHER PUBLICATIONS

Bendix, Bendix Service Data SD-13-4861, Bendix ATR-6 and ATR-3 Antilock Traction Relay Valves, Apr. 2008, pp. 1-8.
Bendix. Bendix Service Data SD-03-1064, Bendix R-12 and R-14 Relay Valves, Mar. 2004, pp. 1-6.
Bendix, Bendix Service Data SD-06-1800, Bendix SL-3 and SL-4 Stop Light Switch, Jun. 2011, pp. 1-4.
International Search Report for PCT/US2015/047060, dated Dec. 18, 2015, 2 pages.
Written Opinion for PCT/US2015/047060, dated Dec. 18, 2015, 7 pages.

* cited by examiner

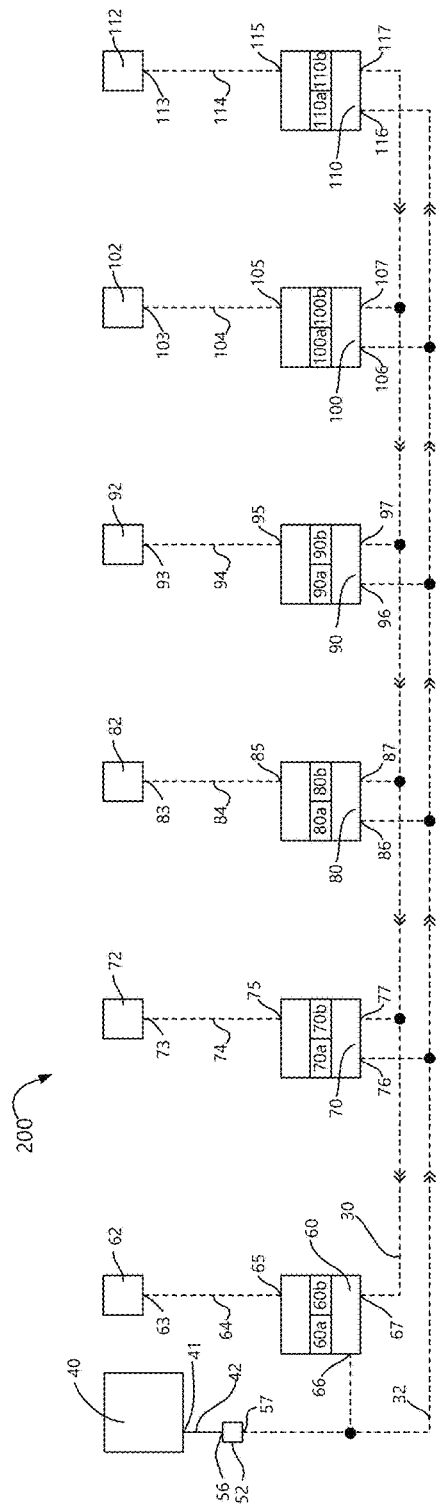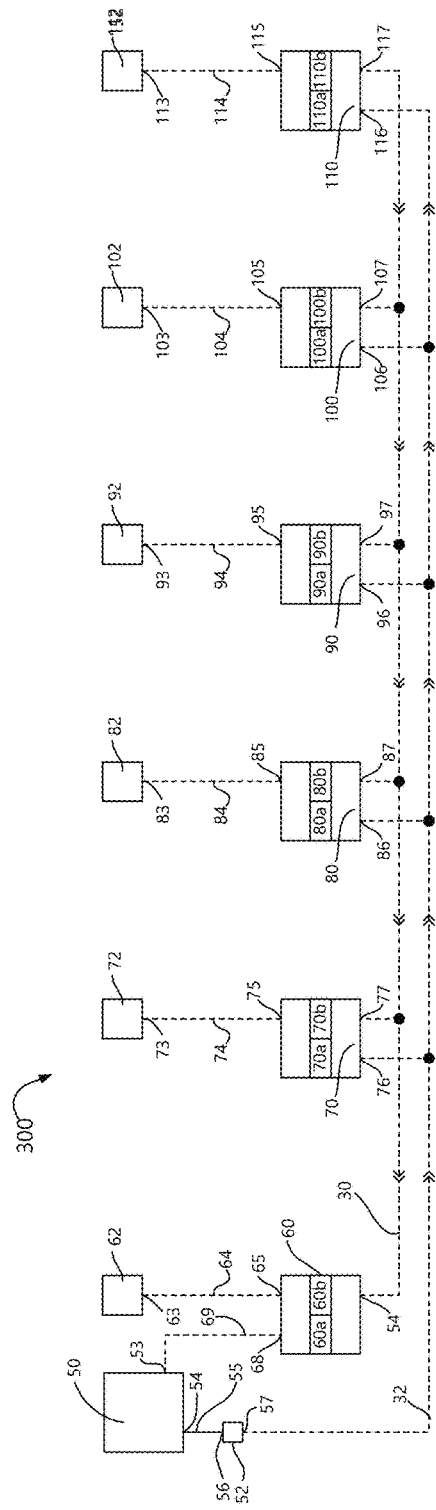

APPARATUS, METHOD AND SYSTEM FOR DETERMINING THE POSITION OF VEHICLES CONNECTED TO A TRACTOR BY THE USE OF A GLOBAL POSITIONING SATELLITE (GPS)

BACKGROUND

A tractor-trailer vehicle, which is equipped with a pneumatic brake system, includes a tractor and one or more towed vehicles depending upon the pay load and the regulations. In current tractor-trailer vehicle systems, the tractor controls the diagnostics for the entire vehicle system. The tractor treats the towed portion of the vehicle train as a "dumb" vehicle, that is, the towed vehicle train is treated as an extension of the same tractor.

SUMMARY

Various example embodiments of controllers for determining the position of vehicles in a tractor-trailer vehicle are disclosed. In accordance with one aspect, a tractor controller of a tractor-trailer vehicle includes an electrical control port for receiving a start signal, a data port for receiving tractor GPS information and a communications port for receiving data from a towed vehicle of a tractor-trailer vehicle that receives the electrical start signal. A processing unit of the tractor controller is in communication with the electrical control port and the communications port, and the processing unit includes control logic. The control logic is capable of: receiving tractor GPS data, a data signal at the communications port in response to the towed vehicle receiving the electrical start signal, wherein the first data signal comprises a unique identification which corresponds to the towed vehicle and a GPS signal; and calculating, at a predetermined response time, the position of the towed vehicle in the tractor-trailer vehicle based on the data signal received. The length and weight of the vehicle train has substantial impact on the stability, control and stopping distance of the tractor-trailer vehicle; and the size and weight of the vehicle train can also vary from trip to trip which can affect control of the tractor-trailer vehicle system overall.

In accordance with another aspect of the present invention, a tractor controller includes an electrical control port for transmitting an electrical signal to a tractor pneumatic source, a data port for receiving tractor GPS information and a communications port for receiving data. A processing unit of the tractor controller is in communication with the electrical control port and the communications port and includes control logic. The control logic is capable of: receiving tractor GPS data, transmitting an electrical start signal to the tractor controller; receiving a first data signal comprising GPS signal and a unique identification at the communications port from the towed vehicle in response to transmitting the electrical start signal; and calculating, at a predetermined response time, the position of the towed vehicle in the tractor-trailer vehicle based on the data signal received.

In accordance with another aspect of the present invention, a towed-vehicle controller of a tractor trailer vehicle includes a first electrical control port for receiving an electrical start signal from a tractor, a second electrical control port for receiving an electronic pressure signal from a tractor pneumatic source, a data port for receiving the towed-vehicle GPS information and a communications port for transmitting data. A processing unit of the towed-vehicle controller includes control logic and is in communication with the first electrical control port, the second electrical control port and the communications port, and includes control logic capable of: receiving towed-vehicle GPS data, transmitting a data signal comprising a GPS signal and a unique identification to the tractor in response to receiving an electronic pressure signal from the tractor pneumatic source.

In accordance with another aspect of the present invention, a method for determining positions of vehicles in a vehicle train of a tractor-trailer vehicle system includes transmitting an electrical start signal and an electronic pressure signal to the towed vehicle; transmitting a data signal from the towed vehicle to the tractor vehicle in response to receiving the electronic pressure signal, the data signal comprising a GPS signal and a unique identification; and determining the position, at a predetermined response time, of the towed vehicle based on the data signal received by the tractor vehicle.

In accordance with another aspect of the present invention, a system for determining positions of a tractor-trailer vehicle train includes a tractor pneumatic source, a stoplight switch in communication with the tractor pneumatic source, and a tractor pneumatic source which is in communication with the pneumatic control valve. The system also includes a tractor controller which includes an electrical port for receiving an electrical start signal, a data port for receiving tractor GPS information and a communications port for receiving data from a towed vehicle of the tractor-trailer vehicle and which also receives a start signal; and a processing unit comprising control logic. The processing unit is in communication with the communications port, and the control logic is capable of: receiving tractor GPS data, receiving a first data signal from the towed vehicle that responds to the electrical start signal at the communications port, the first data signal comprising a first GPS signal and a unique identification which corresponds to the towed vehicle; and calculating, at a predetermined response time, the position of a towed vehicle in the tractor-trailer vehicle based on the data signal received.

BRIEF DESCRIPTION OF THE DRAWINGS

In the accompanying drawings which are incorporated in and constitute a part of the specification, example embodiments of the invention are illustrated, which, together with a general description of the invention given above, and the detailed description given below, serve to exemplify some aspects of this invention.

FIGS. 2 through 5 illustrate schematic representations of a vehicle train sensor system of the tractor-trailer vehicle system of FIG. 1, according to example embodiments of the present invention;

DETAILED DESCRIPTION

Example embodiments of the present invention are directed to determining positions of a towed vehicle train of a tractor-trailer vehicle system. The number of towed vehicles and the relative positions in the vehicle train can be determined. This allows designers of advanced vehicle systems more latitude in design, such as, advanced braking and communication systems the ability to design features that incorporate the entire vehicle train. Aspects of the present invention disclosed herein allow new functions, diagnostics and prognostics of tractor-trailer vehicles which are currently unattainable.

In one aspect the tractor controller can determine the location of the trailers in the vehicle train. The tractor sends electrical and pneumatic signals to the towed vehicles behind it and receives data or information that allows the tractor to make determinations and/or calculations based on the information reported by the trailers and/or dollies. The tractor controller can determine at least one of the number, sequence, and length of the towed vehicles behind it. Towed vehicles, for example, can include trailers as well as dollies that are placed between trailers. In the United States, for example, a typical maximum number of towed vehicles in the towed vehicle train is five towed vehicles, for example, a "turnpike triple" which is made up of three trailers and two dollies.

Figure 1:
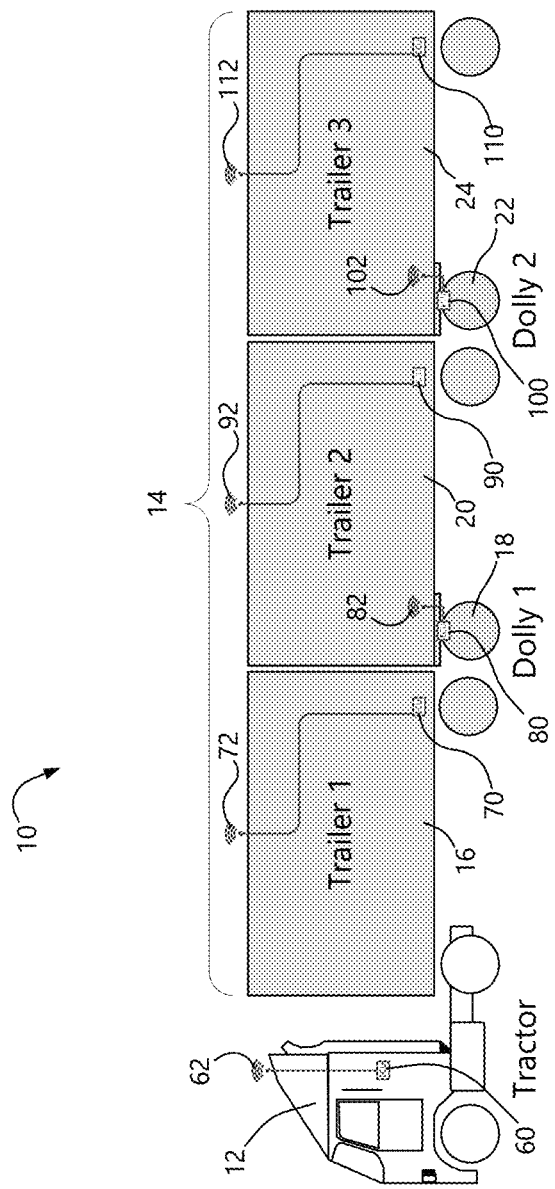
FIG. 1 illustrates a schematic representation of a tractor-trailer vehicle system, according to an example embodiment of the present invention.

FIG. 1 is a schematic illustration of a tractor-trailer vehicle system 10 (e.g., a vehicle train), such as an air brake tractor-trailer vehicle train, for example, according to an example embodiment of the present invention. Tractor-trailer vehicle train 10 includes a towing vehicle 12 (e.g., a tractor and a towed portion 14) including a plurality of towed vehicles 16, 18, 20, 22, 24 pulled by the tractor 12. The towed portion 14 of the vehicle train includes one or more towed vehicles for example trailers 16, 20 and 24, and dollies 18 and 22 which are located between the trailers. The specific number of trailers, dollies and combinations thereof can vary and is not limited by this application, although the maximum number of towed vehicles can vary according to applicable state law.

FIG. 2 through FIG. 5 illustrate electrical and pneumatic components for a tractor and five towed vehicles comprising trailers and dollies as shown in FIG. 1; however, in alternative embodiments additional or fewer vehicles, and different combinations of the number and type of towed vehicles are possible. FIG. 2 is a schematic illustration of a system 200 for determining vehicle-train positions of the towing vehicle 12 and towed portion 14 of the tractor-trailer vehicle train 10 shown in FIG. 1, according to an aspect of the present invention. The vehicle-train determining positions system 200 is a manual or "user-initiated" system and is used for determining the number, the positions, and the length, of the towed vehicles in the towed portion 14 of the tractor-trailer vehicle train 10.

System 200 of FIG. 2 includes tractor components such as a tractor pneumatic control valve 40 which has delivery port 41 in communication with an input port 56 of a stoplight switch 52. An electrical output port 57 of the stoplight switch 52 electrically communicates with a tractor controller 60 and towed vehicles. A suitable stoplight switch 52 associated with tractor pneumatic control valve 40 is SL-4™ by Bendix Commercial Vehicle Systems, LLC of Elyria, Ohio. The tractor controller 60 or "ECU" includes a processor 60a (e.g., a processing unit), control logic 60b, input control port 66, GPS data port 65 and bi-directional communication port 67.

Vehicle-train system 200 of FIG. 2 also illustrates several towed-vehicle components including towed-vehicle controllers, or "ECUs" 70, 80, 90, 100, and 110 associated with trailer and dolly vehicles 16, 18, 20, 22 and 24 (FIG. 1), respectively. Towed-vehicle controllers have GPS data input ports 65, 75, 85, 95, 105 and 115, respectively, stoplight switch (SLS) signal input ports 76, 86, 96, 106 and 116, respectively, and bi-directional communication ports 77, 87, 97, 107 and 117, respectively. Each of the towed-vehicle controllers 70, 80, 90, 100, and 110 includes a respective processor 70a, 80a, 90a, 100a and 110a and a respective control logic 70b, 80b, 90b, 100b, and 110b.

In a user-initiated system, as illustrated in FIG. 2, the tractor pneumatic control valve 40 has pneumatic delivery port 41, which communicates pneumatically with the pneumatic input port 56 of the tractor stop lamp switch 52 via a pneumatic control valve delivery pathway 42. In one embodiment, the manually-operated pneumatic control valve 40 is a foot-operated pneumatic control valve, such as a pneumatic brake pedal. A suitable pneumatic control valve is the E-8P™ by Bendix Commercial Vehicle Systems, LLC of Elyria, Ohio. In such case, the pneumatic control valve 40, when manually activated, conveys pressure, for example up to about 6 psi of air pressure, to the stop lamp switch 52.

Pneumatic air delivered from the delivery port 41 of the pneumatic control valve 40 travels via a pneumatic delivery pathway 42 to the input port 56 of the stoplight switch 52, which transmits an electrical signal via an electrical output port 57 along an electrical transmission line 32 to the tractor controller 60 and at least one towed vehicle 16, 18, 20, 22, 24 of the vehicle train 14. For example, an electrical signal is transmitted along the stoplight switch electrical line 32 to the tractor controller 60, via the input port 66, and the towed-vehicles controllers 70, 80, 90, 100 and 110 of the towed vehicles 16, 18, 20, 22 and 24 (FIG. 1). The electrical signal transmitted by the stoplight switch 52 along the electrical line is a start signal conveyed to the tractor 12 and towed vehicles 16, 18, 20, 22, 24 in response to a manual input from the vehicle operator. For example, the start signal can be manually triggered when the vehicle operator depresses the foot pedal 40 one or more times.

With reference to FIG. 2, each of the towed-vehicle controllers 70, 80, 90, 100, 110 receives an electronic pressure signal, from the tractor controller 60. In response to the towed-vehicle controllers 70, 80, 90, 100, 110 receiving the electronic pressure signal, the towed-vehicle controllers 70, 80, 90, 100, 110 transmit respective data signals via bi-directional communication ports 77, 87, 97, 107, 117 to the tractor controller 60 via a tractor controller bi-directional communication port 67 of the tractor controller 60 and a communication path 30. The communication path is a bi-directional communication path between the tractor controller 60 and one or more of the towed-vehicle controllers 70, 80, 90, 100, 110 that are physically or wirelessly connected to the communication path 30. In one example, communication path 30 is a hard-wired serial communication bus. The serial communication bus may be arranged to carry out communications according to an industry standard protocol, including but not limited to, SAE J1939 and/or one of several proprietary bus protocols. For example, PLC for trucks, SAE J2497 is a protocol that can be used on a power line communication (PLC) carries data on a conductor that can also be used simultaneously for electric power transmission. SAE J1939 is an example protocol that can be used on a controller area network (CAN). A discrete hard-wired logic line could alternatively be used as the communication path 30.

The tractor controller 60 is in communication with the tractor stop light switch 52, tractor GPS antenna 62 and is also in communication with at least one of towed-vehicle controllers 70, 80, 90, 100, 110. The processing unit 60a may include volatile memory, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit 60a.

The tractor control logic 60b receives data messages from at least one of the towed-vehicle controllers 70, 80, 90, 100, 110. Each of the controller messages includes a GPS signal and a unique identification of the respective towed vehicle 16, 18, 20, 22, 24. The unique identification can be one of several numbers, signals or markings to distinguish one towed vehicle from another towed vehicle. Examples of unique identifications can include, but are not limited to, a vehicle identification number (VIN), or a serial number, the dimensions of the vehicle, for example, to distinguish whether it is a dolly or a trailer, etc.

Accordingly, in an aspect of the present invention the tractor controller 60 of vehicle-train system 10 includes an electrical control port 66 for receiving a start signal, and a communications port 67 for receiving data from one or more of the towed vehicle controllers 70, 80, 90, 100, 110. The tractor controller 60 also includes a processing unit 60a, which electrically communicates with the electrical control port 66 and the communications port 67, and control logic 60b. The control logic 60b is capable of receiving a data signal comprising a GPS signal and a unique identification which corresponds to a respective one of the towed vehicles 16, 18, 20, 22, 24, at the communications port 67, from the towed vehicle in response to the electrical start signal. The control logic is capable of determining at least one of the position of the respective towed-vehicle in the vehicle train and the length of the respective towed-vehicle of the tractor-trailer vehicle.

In another aspect of the present invention, each of the towed-vehicle controllers 70, 80, 90, 100, 110 of a vehicle-train system 10 includes a respective first electrical control port 76, 86, 96, 106, 116 for receiving an electrical signal, for example a start signal, from the tractor 12, and a respective communication port 77, 87, 97, 107, 117 for transmitting data. Each of the processing units 70a, 80a, 90a, 100a, 110a of the respective towed-vehicle controllers 70, 80, 90, 100, 110 includes control logic 70b, 80b, 90b, 100b, 110b and is in communication with the respective electrical control port 76, 86, 96, 106, 116, the respective GPS data port 75, 85, 95, 105, 115 and the respective communications port 77, 87, 97, 107, 117, and includes respective control logic capable of transmitting a data signal comprising a GPS signal and a unique identification to the tractor in response to receiving an electronic pressure signal from a pneumatic source of the tractor. A system for determining positions of a tractor-trailer vehicle includes: the towed-vehicle controller described above, a tractor controller, a stoplight switch in communication with the tractor controller and at least one towed-vehicle of the tractor-trailer vehicle.

In another example, the initiation of a vehicle train system can be automatic rather than manual. FIG. 3 is a schematic illustration of a vehicle-train system 300 of tractor-trailer vehicle 10 shown in FIG. 1, according to another aspect of the present invention. Accordingly, in one example tractor controller 60 initiates the vehicle system by sending an electrical signal from control port 68 along electrical path 69 to port 53 of the tractor pneumatic source 50 (e.g., an electrically controlled pneumatic valve that is also referred to as an "electro-pneumatic valve"). An example of the pneumatic source 50 is the ATR-6™ antilock traction relay valve from Bendix Commercial Vehicle Systems, LLC of Elyria, Ohio. The pneumatic source 50, when activated, can convey pressure, for example greater than 6 psi, via pneumatic line 55 to input port 56 of stoplight switch 52, which transmits an electrical signal, based on the pressure at the input port 56, via output port 57 along electrical line 32 to at least one of the towed vehicles 70, 80, 90, 100, 110 in the vehicle train. For example, electrical signal is transmitted along stoplight switch electrical line to control input ports of towed-vehicles controllers 70, 80, 90, 100 and 110 of towed vehicles 16, 18, 20, 22 and 24 (FIG. 1).

The system 300 can be used for determining at least one of, the position, sequence, and length of the towed vehicles 70, 80, 90, 100, 110 in the tractor-trailer vehicle train 10 and can be initiated automatically with the turn of an ignition key each time the tractor vehicle is turned on, for example.

The tractor controller 60 includes a processing unit 60a and control logic 60b. The tractor controller 60 is in communication with tractor air control valve 50, and is also in communication with at least one of the towed-vehicle controllers 70, 80, 90, 100, 110. The processing unit may include volatile memory, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit. The control logic 60b receives control data messages from at least one of the towed vehicle controllers 70, 80, 90, 100, 110. The control data messages include respective GPS signals and respective unique identifications for each of the towed vehicles 16, 18, 20, 22, 24.

In the illustrated embodiments, the tractor controller 60 is a stand-alone controller of the vehicle-train systems 10. In other embodiments, it is contemplated that the controller is combined with another controller in the tractor-trailer vehicle 10. For example, in one aspect, tractor controllers manage the antilock braking system and/or electronic stability control functions in addition to determining positions of the towed portion of vehicle train of the tractor-trailer vehicle. Alternatively, tractor controller 60 manage other functions in the tractor-trailer system.

Accordingly, in an aspect of the present invention, the tractor controller 60 depicted in FIG. 3 of a tractor-trailer vehicle 10 includes an electrical control port 68 for transmitting an electrical signal to a tractor pneumatic source 50, and an electrical communications port 54 for receiving data. A processing unit 60a of the tractor controller 60 is in communication with the electrical control port 68 and the communications port 54 and includes control logic 60b. The control logic 60b is capable of: transmitting an electrical start signal to the tractor pneumatic source 50. The control logic 60b is also capable of receiving i) a first data signal comprising a respective GPS signal and ii) a respective unique identification signal at the communications port 54 from at least one of the towed vehicle controllers 70, 80, 90, 100, 110 in response to receiving the electrical start signal. The control logic 60b is capable of calculating the position of the respective towed vehicles 16, 18, 20, 22, 24 (see FIG.

1) in the tractor-trailer vehicle 10 based on the GPS signal received. A system for determining positions of a tractor-trailer vehicle 10 includes: the controllers 60, 70, 80, 90, 100, 110 described above, a pneumatic source 50, which communicates (e.g., pneumatically) with stoplight switch 52, and the towed-vehicles 16, 18, 20, 22, 24 of the tractor-trailer vehicle 10.

Figure 4:
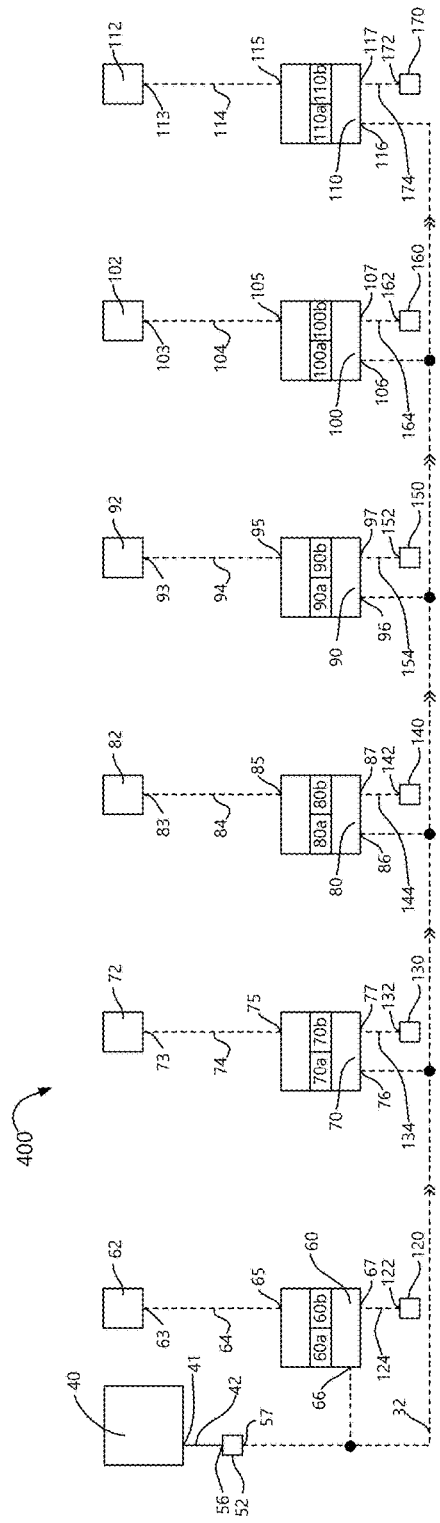
Figure 5:
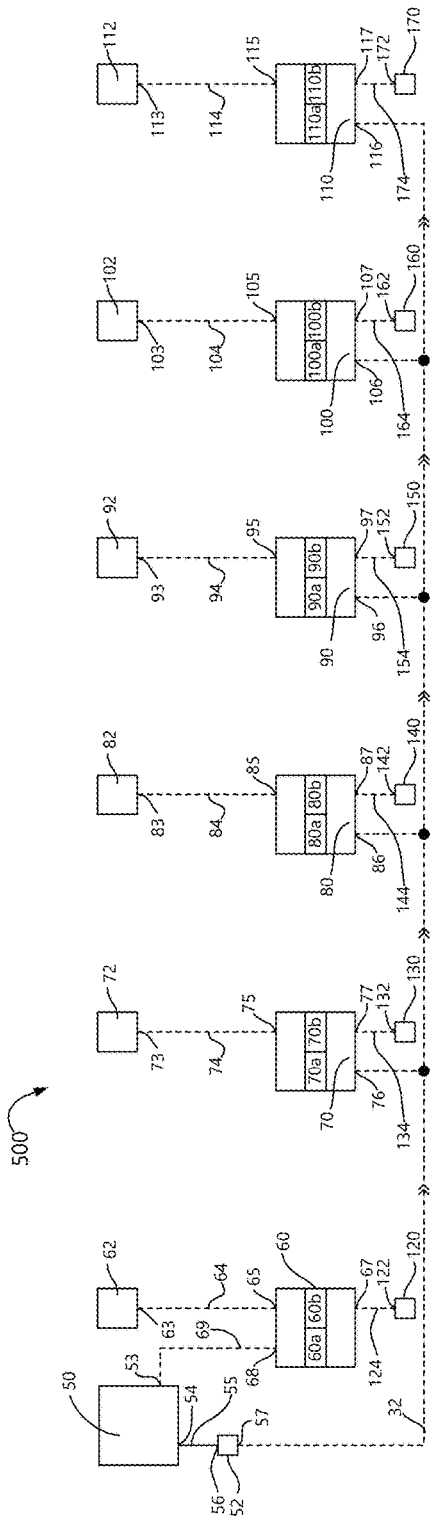

FIG. 4 is a schematic representation of the manually-initiated tractor-trailer vehicle control system 400 which is similar to FIG. 2 above and includes wireless transmitter and receivers for communication. System 400 includes tractor wireless receiver and transmitter 120 having bi-directional communication port 122 and communicates with tractor controller 60. Each of the towed-vehicle controllers 70, 80, 90, 100 and 110 is equipped with a respective wireless receiver and transmitter 130, 140, 150, 160 and 170, which communicates with tractor controller 60. FIG. 5 is a schematic representation of the controller-initiated tractor-trailer vehicle control system 500 which is similar to FIG. 3 above which includes the wireless transmitter and receivers for communication as stated in system 400 above.

In both FIGS. 4 and 5 the wireless receiver/transmitters 130, 140, 150, 160 and 170 decode the respective time value and unique identification information from the selected data format to a time value and unique identification message capable of being communicated. The format of the data may be a standard protocol and can include, but is not limited to, an RKE protocol, a Zigbee protocol, an XBee protocol, a Bluetooth protocol, and an IEEE 802.11 protocol, for example. An example proprietary protocol is TPMS.

In alternative examples the wireless receiver/transmitters are integrated with controller 60. In this arrangement, the control logic 60b receives the data sent from the towed vehicle controllers 70, 80, 90, 100, and 110. The data sent from the towed vehicle controllers can include a respective GPS coordinate and a respective unique identification from the towed vehicles in response to receiving the electrical start signal from the tractor. If for example, there are no towed vehicles, i.e. tractor is "bobtail" then tractor controllers 60 will not receive a response via a hard-wired communication line or via the wireless transmitters.

In another aspect, a method for determining positions of a vehicle of a tractor-trailer vehicle train includes: transmitting an electrical start signal; transmitting a first data signal from the first towed vehicle to the tractor vehicle, the first data signal comprising a GPS coordinate and a first unique identification in response to the transmission of the electrical start signal; and determining the position of the towed vehicle based on the data received. In another example, the method further includes transmitting a second data signal from a second towed vehicle to the tractor vehicle, and the second data signal comprises a second GPS coordinate and a second unique identification in response to transmission of the electrical start signal.

Figure 6:
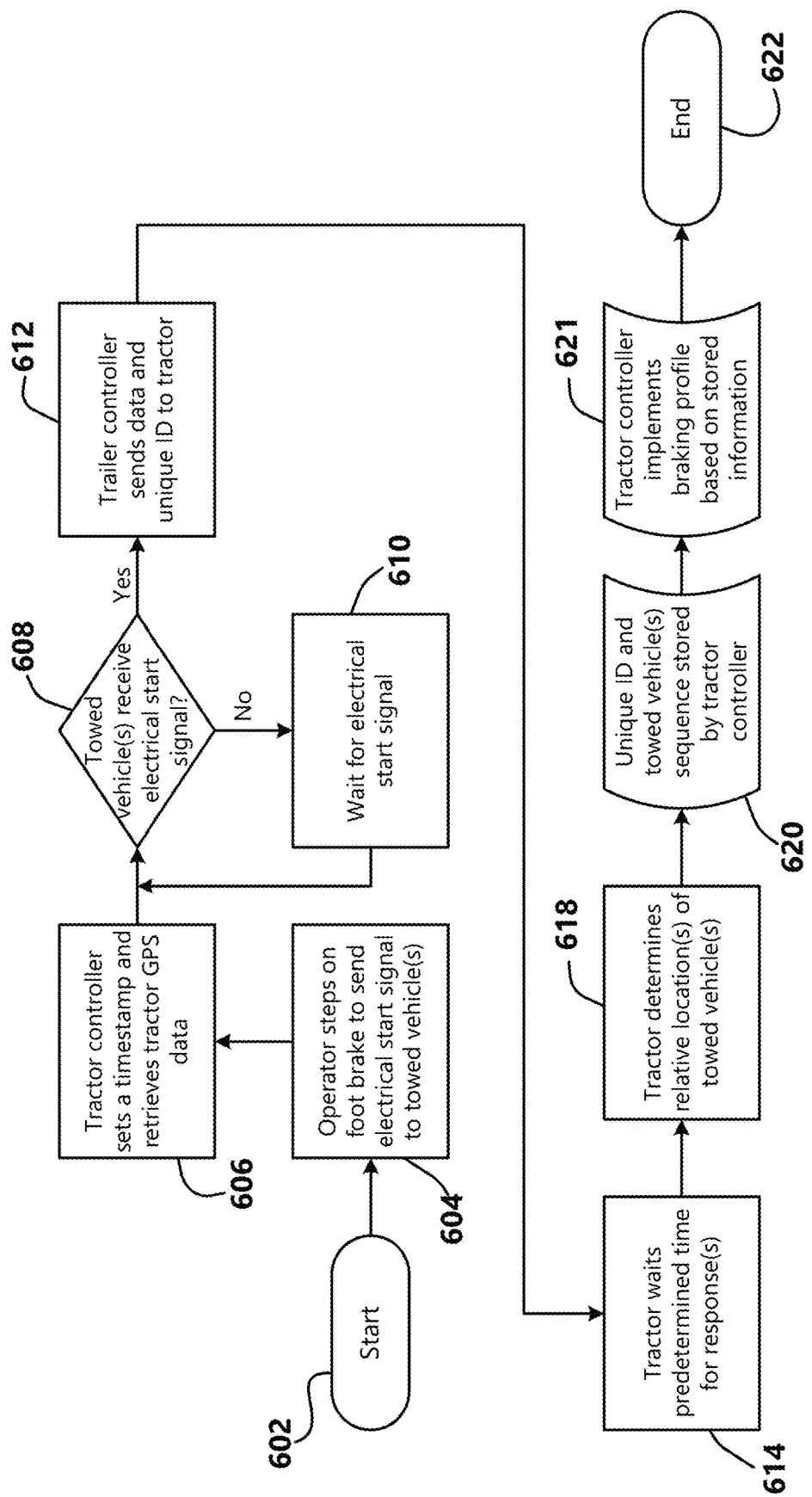
FIGS. 6 and 7 illustrate methods of implementing the vehicle train sensor system, according to example embodiments of the present invention.

A flowchart illustration for implementing a method 600 for determining the positions of the vehicles of positions relative to the tractor the vehicle train of a tractor-trailer vehicle, in accordance with an aspect of the present invention is shown in FIG. 6. With reference to FIGS. 2-6, method 600 starts at box 602. When an operator of the vehicle performs an initiation sequence, for example via depressing the foot brake valve, an electrical start signal is sent to tractor controller 60 and at least one of the towed vehicle controllers 70, 80, 90, 100, 110 of towed vehicle train 14 (FIG. 1), as depicted at box 604. Tractor controller 50 sets a timestamp, in a box 606, for use in determining the elapsed time to wait for signals from the towed vehicles 16, 18, 20, 22, 24 and retrieves tractor GPS data to be used in calculating a respective towed vehicle position of the towed vehicles 16, 18, 20, 22, 24.

A determination is made in a box 608 whether the towed vehicle(s) 16, 18, 20, 22, 24 receive the electrical start signal. If it is determined the towed vehicle(s) have not received the electrical start signal, control passes to a step 610 and returns to the step 608 to wait for the electrical start to be received by the towed vehicle(s). On the other hand, if it is determined in the step 608 that the towed vehicle(s) have received the electrical start signal, control passes to a step 612.

Referring still to FIG. 6 the control logic or method described above is repeated in each of the towed vehicle controllers, for example controllers 70, 80, 90, 100, and 110 of vehicles 16, 18, 20, 22, and 24, respectively. That is, tractor controller 60 (see FIGS. 2-5) eventually receives data from each of the towed vehicles as depicted in box 612.

Once the predetermined time (e.g., between about 0.1 seconds to about 5 seconds) has elapsed for all the towed vehicles to respond, as indicated in box 614, control passes to a box 618.

In the box 618, the tractor controller 60 determines the position of each of the towed vehicles 16, 18, 20, 22, 24 behind the tractor 12. The control logic 60b (see FIGS. 2-5) determines the position(s) of the towed vehicle(s). If the control logic 60b only receives data from a single towed vehicle, the control logic 60b determines the relative position of the towed vehicle to the tractor. The relative position of the towed vehicle may or may not be adjacent to the tractor. In one embodiment, respective unique identifications of at least one of the towed vehicles 16, 18, 20, 22, 24 is received by the controller 60 in a box 620. The unique identification(s) are used in the box 618 to determine the relative positions for each respective towed vehicle.

The tractor controller 60 stores the unique identification and the correct sequence of each towed vehicle behind the tractor as determined in box 618, as depicted in box 620. In another aspect, a vehicle-train that includes towed-vehicles which do not have a controller or ECU the tractor controller can nevertheless determine the sequence of vehicles in the vehicle train based on at least one of the GPS coordinates and the unique identification data. In box 621, a braking profile for the tractor-trailer vehicle train 10 is set based on the data from each of the towed vehicles, GPS coordinates, unique identification and weight of the tractor 12. The braking profile identifies a stopping distance for the vehicle train 10 based on the weights and GPS coordinates of the tractor 12 and each of the towed vehicles 16, 18, 20, 22, 24 pulled by the tractor 12. The method ends in a box 622.

Figure 7:
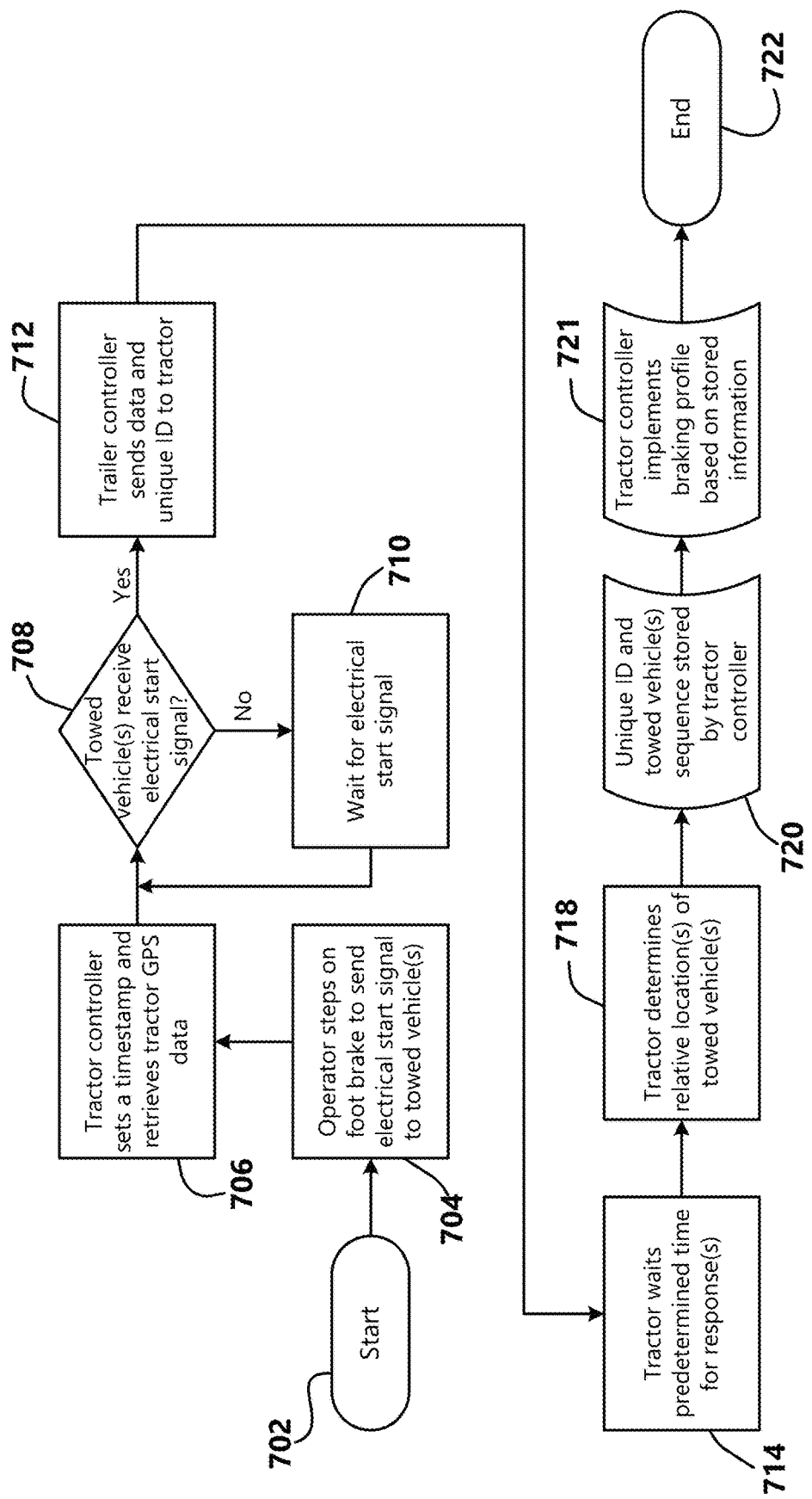

A flowchart illustration for implementing a method 700 for determining the positions of the vehicles of positions relative to the tractor the vehicle train of a tractor-trailer vehicle, in accordance with an aspect of the present invention is shown in FIG. 7. With reference to FIGS. 2-5 and 7, method 700 starts when the tractor controller 60 performs the initiation sequence by sending a start signal to tractor air control valve 50, which sends an electrical start signal to at least one towed vehicle of towed vehicle train 14 (FIG. 1), as depicted at box 704. Tractor controller 50 also receives a timestamp, in the box 706, for use in determining the elapsed time to wait for signals from the towed vehicles 16, 18, 20, 22, 24 and retrieves tractor GPS data to be used in calculating a respective towed vehicle position of the towed vehicles 16, 18, 20, 22, 24. A determination is made in box 708 whether the at least one towed vehicle has received the electrical start signal. If it is determined in the box 708 that the at least one towed vehicle has not received the electrical start signal, control passes to box 710 to wait for at least one towed vehicle to receive the electrical start signal before control returns to the box 708. If, on the other hand, it is determined in the box 708 that the at least one towed vehicle has received the electrical start signal, control passes to box 712.

The method waits, in box 714, a predetermined time to receive responses from each of the towed vehicle controllers, for example controllers 70, 80, 90, 100, and 110 of vehicles 16, 18, 20, 22, and 24, respectively. Once the predetermined time has elapsed, control passes to box 718. Therefore, tractor controller 60 eventually receives data from each of the towed vehicles by the time the control has reached box 718.

Once the time has elapsed for all the towed vehicles to respond, tractor controller 60 determines the position of each towed vehicle behind the tractor, in box 718, via control logic 60b. The positions are calculated for each corresponding towed vehicle having an associated unique identification. If the control logic 60b only receives data from a single towed vehicle, the control logic 60b determines the relative position of the towed vehicle to the tractor. The relative position of the towed vehicle may or may not be adjacent to the tractor. The tractor controller 60 stores the unique identification and the correct sequence of each towed vehicle behind the tractor as depicted in box 720. In another example, the tractor controller stores or calculates the length of each vehicle based on the unique identification data. In another aspect, a vehicle-train that includes towed-vehicles which do not have a controller or ECU the tractor controller can nevertheless determine the sequence of vehicles in the vehicle train based on at least one of the GPS coordinates and the unique identification data.

Based on known tractor-trailer vehicles and GPS coordinates, the location of each towed vehicle for a particular tractor-trailer vehicle would allow the tractor controller to determine the location or distance from the tractor. Therefore, if one or more towed vehicle does not include a controller, the tractor controller can still determine the position and/or the sequence of the vehicles that do have a towed-vehicle controller according to the aspects described herein. Moreover, the tractor controller can determine the type of towed vehicle based on the data, for example, whether the towed vehicle is a dolly or a trailer, and the length of the towed vehicle.

Figure 8:
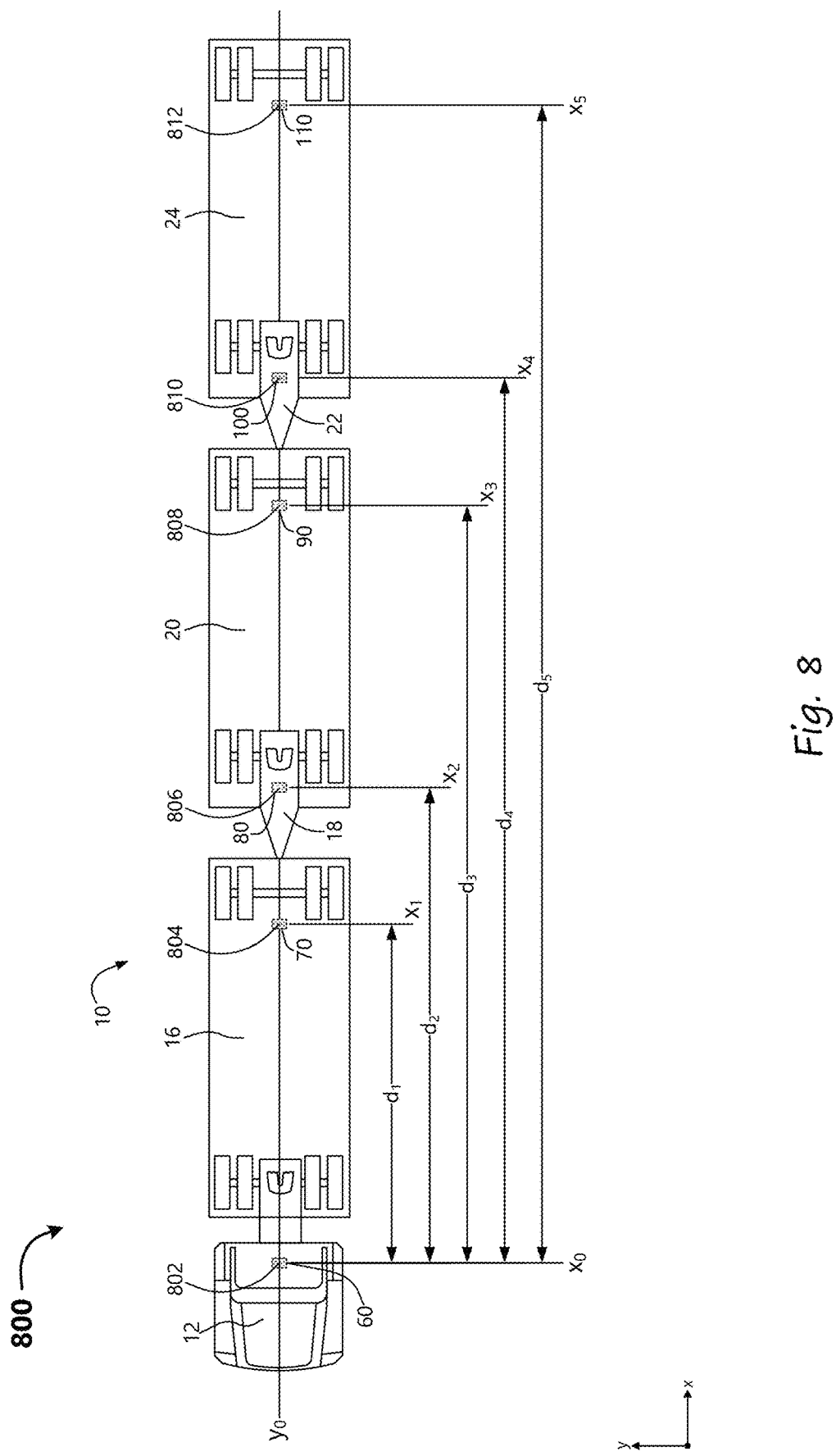
FIG. 8 is a top view schematic illustration of a tractor-trailer vehicle showing the tractor vehicle and towed vehicles in a road driving configuration, according to example embodiments of the present invention.
Figure 9:
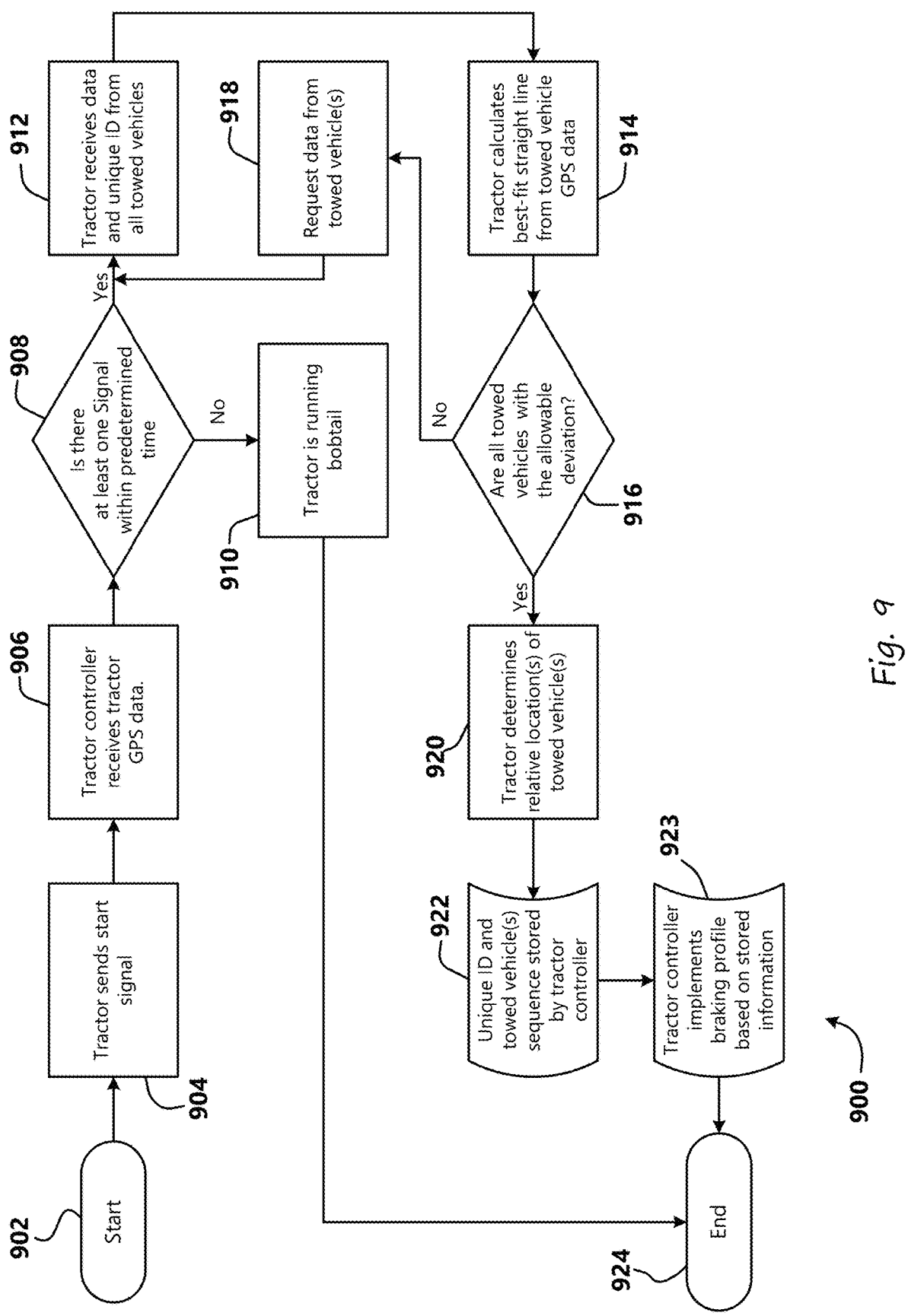
FIG. 9 is a flow chart representing the method of determining at least one of vehicle position and sequence in a tractor-trailer vehicle, according to example embodiments of the present invention.

FIG. 8 and FIG. 9 illustrate that a tractor-trailer vehicle system includes a tractor and one or more towed vehicles positioned in various configurations such that the trailers and dollies are in different positions. A tractor controller herein can calculate the positions of the individual towed vehicles for example the x-y coordinates. In accordance with an aspect of the present invention, the tractor controller can determine the distances of the towed vehicle relative to the tractor, and in another example, the tractor controller determines correct sequence of vehicles that follow behind the tractor. These illustrated positional configurations of the tractor-trailer vehicle system in FIG. 8 and FIG. 9 are just a few of a myriad of configurations possible both on the road and in parked positions.

FIG. 8 is a schematic illustration which shows the tractor-trailer vehicle system 10 positioned in a configuration 800 on a planar x-y coordinate system such that each vehicle is substantially linearly aligned along the x-axis. For example, the direction of the tractor-trailer vehicle system in motion is shown along the x-axis. Tractor-trailer vehicle system 10 includes tractor 12, trailer 16, dolly 18, trailer 20, dolly 22 and trailer 24. Tractor 12 includes controller 60 illustrated at position 802 ($X_0$, $Y_0$). The towed vehicles include the following: trailer 16, which includes controller 70 illustrated at position 804 ($X_1$, $Y_0$) at a distance $d_1$ along the x-axis from tractor position 802; dolly 18, which includes controller 80 illustrated at position 806 ($X_2$, $Y_0$) at a distance $d_2$ along the x-axis from tractor position 802; trailer 20, which includes controller 90 illustrated at position 808 ($X_3$, $Y_0$) at a distance $d_3$ along the x-axis from tractor position 802; dolly 22, which includes controller 100 illustrated at position 810 ($X_4$, $Y_0$) at a distance $d_4$ along the x-axis from tractor position 802; and trailer 24, which includes controller 110 illustrated at position 812 ($X_5$, $Y_0$) at a distance $d_5$ along the x-axis from tractor position 802. The tractor controller can determine towed vehicle position and type from vehicle type data received and the differences in the X data received from the towed vehicle.

FIG. 9 illustrates a flowchart for implementing a method 900 for determining at least one of the distance of the towed vehicle from the tractor, the sequence of the towed vehicle in the tractor-trailer vehicle and the relative positions of each towed vehicle, relative to one another, in a tractor-trailer vehicle train 10 (FIG. 8). The method or algorithm starts at box 902 and assumes that there is a maximum of three trailers and also assumes that there is no dolly following a trailer that is the last trailer. At box 904 the tractor sends a start signal to the tractor-trailer vehicle train. At 906, the tractor receives its own GPS data. At 908, the tractor checks that there is at least one signal returned within a predetermined time. If so, at 912, it receives data from each of the towed vehicles. The data includes the GPS coordinates, unique identification and weights of each respective towed vehicle. If no signal is returned, the tractor is running bobtail and control passes to box 924 to end.

From box 912, control passes to box 914 for determining a best-fit straight line from all towed vehicles GPS X and Y coordinate data. The method then, at 916, compares the individual towed vehicle GPS coordinates to the calculated straight line and determines if they are within an acceptable deviation, 5% as an example. If they do not fall within the acceptable deviation, the tractor requests the towed vehicle data again in box 918 before returning to box 912, and will do so until the condition at box 916 is satisfied. If the towed vehicles are within the acceptable deviation at the box 916, the tractor determines the relative location of the towed vehicles in box 920 and stores the Unique ID, data and sequence as in box 922. In box 923, a braking profile for the tractor-trailer vehicle train 10 is set based on the data from each of the towed vehicles, GPS coordinates, unique identification and weight of the tractor 12. The braking profile identifies a stopping distance for the vehicle train 10 based on the weights and GPS coordinates of the tractor 12 and each of the towed vehicles 16, 18, 20, 22, 24 pulled by the tractor 12. At this point the method ends at box 924.

While the present invention has been illustrated by the description of aspects thereof, and while the examples have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A tractor controller of a tractor in a tractor-trailer vehicle train comprising:
a processing unit comprising control logic, wherein the control logic is capable of:
receiving a tractor GPS value that indicates a tractor controller location of the vehicle train;
receiving a data signal in response to a towed vehicle controller receiving an electrical start signal, wherein the data signal comprises a unique identification that corresponds to the towed vehicle and a towed vehicle GPS value that indicates a location of the towed vehicle controller of the towed vehicle of the vehicle train;
calculating a position of the towed vehicle in the tractor-trailer vehicle train based on the data signal received;
receiving a second data signal associated with a second towed vehicle, the second data signal comprising a second towed vehicle GPS value that is different than the towed vehicle GPS value and a second unique identification that is different than the unique identification;
calculating a second position of the second towed vehicle based at least upon the towed vehicle GPS value and the second towed vehicle GPS value received by the tractor controller; and
calculating the position of the towed vehicle and the second position of the second towed vehicle based on a best-fit straight line from the coordinates of the towed vehicle GPS value and the second towed vehicle GPS value and determining the sequence of the towed vehicle and the second towed vehicle based on the towed vehicle GPS value and the second towed vehicle GPS value and the towed vehicle unique identification and the second towed vehicle unique identification;
wherein the tractor controller sets a braking profile based on the data signal and applies an associated vehicle brake for decelerating the tractor-trailer vehicle train according to the braking profile.

2. The tractor controller of claim 1, wherein the electrical start signal is transmitted to the towed vehicle controller by a stoplight switch.

3. The tractor controller of claim 1, wherein the tractor controller transmits an electrical signal to a pneumatic source that conveys air pressure to a stoplight switch, and the stoplight switch transmits the electrical start signal to the towed vehicle controller after receiving the air pressure from the pneumatic source.

4. The tractor controller of claim 1, wherein the tractor controller receives the electronic start signal and the position of the towed vehicle is calculated at a predetermined response time after the tractor controller receives the electrical start signal, wherein the predetermined time ranges from about 0.1 seconds to about 5 seconds.

5. The tractor controller of claim 4, wherein the tractor controller and the towed vehicle controller receive the start signal from a stoplight switch of the tractor.

6. The tractor controller of claim 1, wherein the tractor controller and the towed vehicle controller receive the GPS signal after the towed vehicle controller receives the start signal.

7. The tractor controller of claim 1, wherein the data signal received is the only data signal received by the tractor controller at the expiration of a predetermined response time, and the control logic calculates the position of the towed vehicle to be in a position adjacent to the tractor of the tractor-trailer vehicle train.

8. The tractor controller of claim 1, wherein the control logic calculates the second position of the second towed vehicle relative to the tractor based at least upon the towed vehicle GPS value and the second towed vehicle GPS value received by the controller.

9. The tractor controller of claim 1, wherein the unique identification includes the length data of the length of the towed vehicle and the second unique identification includes length data of the length of the second towed vehicle.

10. The tractor controller of claim 1, comprising a communications port for receiving data from the towed vehicle, and an electrical control port for receiving the electrical start signal.

11. The tractor controller of claim 10, wherein the communications port is electrically connected to a hard-wired serial communications bus.

12. The tractor controller of claim 10, wherein the communications port is configured to receive wireless communication.

13. The tractor controller of claim 1, wherein the tractor controller comprises an electrical control port for transmitting an electrical control signal to a tractor pneumatic source to initiate the start signal.

14. The tractor controller of claim 1, wherein:
the data signal also comprises a weight corresponding to the towed vehicle.

15. A method for determining positions of a vehicle train of a tractor-trailer vehicle, the method comprising:
transmitting an electrical start signal from a tractor vehicle to a towed vehicle controller;
based on receiving the electrical start signal, transmitting a data signal from the towed vehicle controller, the data signal comprising a GPS signal and a unique identification based on the towed vehicle controller;
receiving the data signal by a tractor controller of the tractor vehicle;
determining, at a predetermined response time, the position of the towed vehicle relative to the tractor vehicle based on the data signal received;
transmitting a second data signal from a second towed vehicle controller, the second data signal comprising a second GPS signal and a second unique identification based on the second towed vehicle controller in response to transmission of the electrical start signal;
determining, at a predetermined response time, the position of the second towed vehicle relative to the tractor vehicle based on the second data signal received;
setting a braking profile based on a weight of the tractor vehicle, the GPS signal and a weight of the towed vehicle; and
braking the tractor-trailer vehicle based on the braking profile to decelerate the vehicle;
wherein determining the positions of the towed vehicle and the second towed vehicle relative to the tractor vehicle is achieved based on a best-fit straight line representing i) GPS coordinates of the GPS signal and tractor GPS coordinates of a tractor GPS signal and ii) second GPS coordinates of the second GPS signal and the tractor GPS coordinates.

16. The method of claim 15, wherein the method comprises determining a sequence of the towed vehicle and the second towed vehicle based on the positions of the towed vehicle and second towed vehicle, the unique identification and the second unique identification.

17. The method of claim 15, wherein the method comprises:
   determining a total weight of the towed vehicle based on the data signal.

* * * * *